United States Patent [19]

Price et al.

[11] 4,125,194
[45] Nov. 14, 1978

[54] TORQUE ARM ASSEMBLY

[75] Inventors: Raymond R. Price, Rochester; Michael A. Elder, Plainview, both of Minn.

[73] Assignee: Rochester Silo, Inc., Rochester, Minn.

[21] Appl. No.: 735,696

[22] Filed: Oct. 26, 1976

[51] Int. Cl.² ............................................. B65G 65/38
[52] U.S. Cl. .................................. 214/17 DB; 302/56
[58] Field of Search .................... 214/17 DB; 302/56; 222/404, 405

[56] References Cited

U.S. PATENT DOCUMENTS

| 3,002,790 | 10/1961 | Chapman | 214/17 DB X |
| 3,698,575 | 10/1972 | Koser et al. | 214/17 DB |
| 4,043,465 | 8/1977 | Rutten et al. | 214/17 DB |

Primary Examiner—Robert G. Sheridan
Attorney, Agent, or Firm—Williamson, Bains, Moore & Hansen

[57] ABSTRACT

A torque arm assembly for securing a silo unloader output chute. The assembly preferably comprises first frame means adapted to extend vertically upwardly from the silo unloader and second, generally horizontal tracking frame means pivotally coupled to the first frame section for sequentially engaging silage discharge orifices. In operation the tracking frame alternately engages and then withdraws from each silo silage discharge orifice before dropping to a lower position. The tracking frame preferably includes latching means for selectively grasping the silo's discharge orifice partitions to control downward movement and cooperating roller wheel means for smoothly contacting the discharge orifice partitions to facilitate proper subsequent engagement within a lower discharge orifice. The latching means preferably comprises a fork portion pivotally coupled to the tracking means which temporarily grasps the orifice partitions to delay downward movement. A suspension bracket included to secure the silage discharge output chute preferably includes bearing wheels which ride on the tracking section, preventing interference with the movement of same.

17 Claims, 9 Drawing Figures

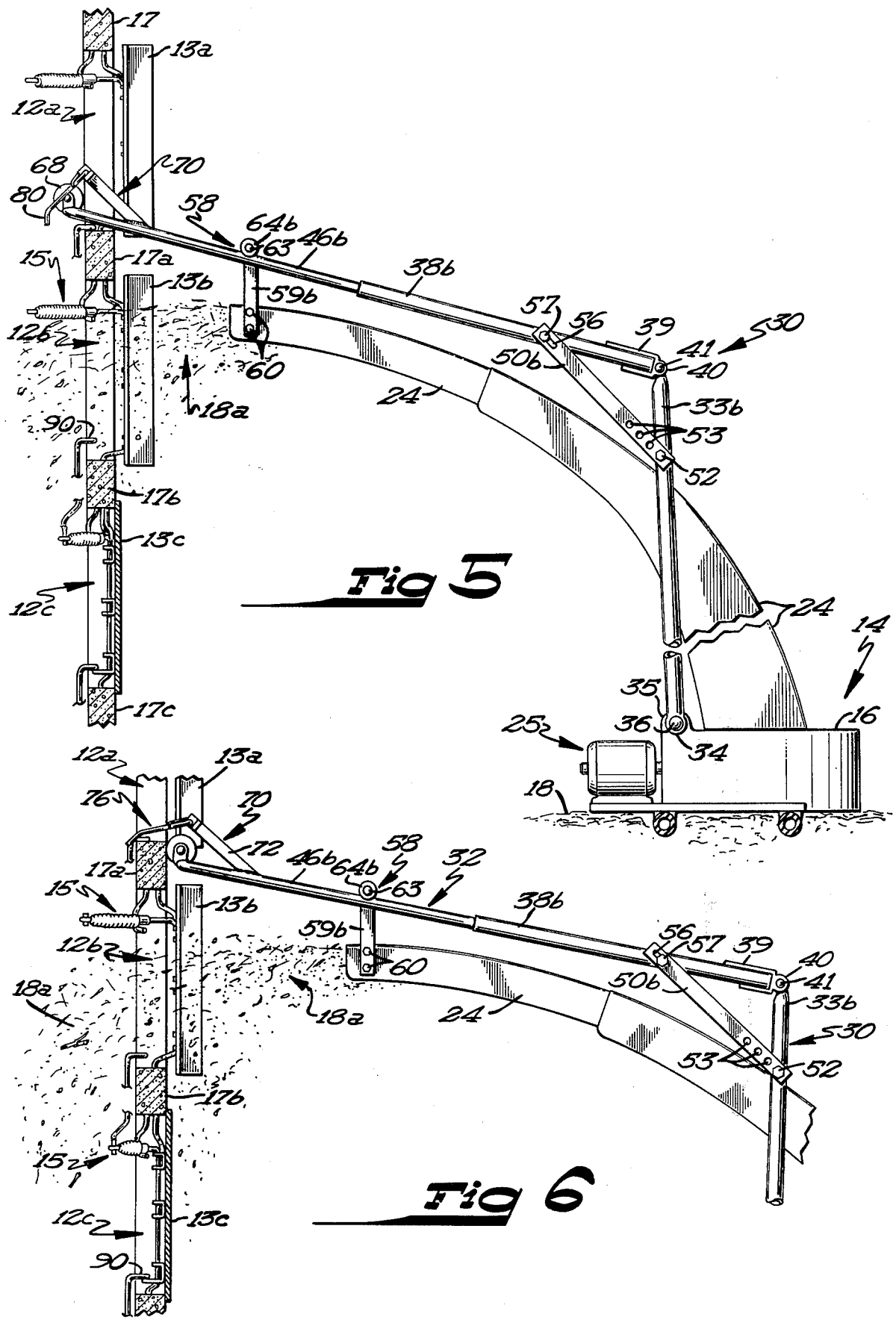

TORQUE ARM ASSEMBLY

BACKGROUND OF THE INVENTION

The instant invention relates generally to silo unloader apparatus. More particularly, the present invention relates to apparatus for automatically facilitating the orderly positioning of a silo unloader output chute during a silo unloading operation.

At present a variety of prior art silo unloader apparatus is employed in the agricultural arts. Most of these comprise a base portion adapted to be centrally disposed within the silo overlying the silage therewithin. A rotatable auger assembly coupled to the base revolves within the silo, thereby picking up silage. The auger assembly communicates with a discharge chute through which silage is forced by blower apparatus. The discharge chute must of course be properly aligned with respect to the silage discharge orifices provided in the silo in order to facilitate the passage of silage therethrough. As the auger assembly continuously rotates and picks up and discharges silage, the vertical position of the silage unloading apparatus will continually recede. Known prior art silage unloaders are disclosed in U.S. Pat. Nos. 2,963,327, issued Dec. 6, 1960; 3,002,790, issued Oct. 3, 1961 to G. Chapman; 3,539,059, issued Nov. 10, 1970; 3,698,575, issued Oct. 17, 1972; and 3,065,033, issued Nov. 20, 1962. Each of the latter references include some form of chute positioning apparatus relevant to the torque arm assembly described herein.

Of course when most silo unloaders of the latter type are employed, the discharge orifice doors must be opened at an appropriate time. One type of door for blocking silage discharge orifices is described in my co-pending patent application entitled "Automatic Silo Door System," filed July 29, 1976, Ser. No. 709,935, now U.S. Pat. No. 4,071,977 and owned by the same assignee as in the instant case.

As the level of silage decreases during the unloading operation the silage discharge chute must be repositioned relative to a lower silage discharge orifice. Chute repositioning is usually done manually with prior art devices. Most silo unloader torque arm assemblies have some portion received through the silage discharge orifices to track within same. However, no known prior art silage discharge apparatus includes means for automatically, sequentially engaging silage discharge orifices while specifically limiting the dropping distance of the torque arm apparatus to an increment of the discharge orifice height.

SUMMARY OF THE INVENTION

The instant invention comprises a torque arm assembly which can be successfully employed in conjunction with silo unloaders to sequentially, precisely control the silage discharge chute during an unloading operation. A silo unloader characterized by torque arm apparatus of this nature is also set forth.

The torque arm assembly described herein preferably comprises an upwardly extending frame section which is adapted to be pivotally coupled to the unloader, and a tracking section which is coupled to the first frame section and extends generally horizontally therefrom. The tracking section sequentially engages the silage discharge orifices during the unloading process to control the apparatus. In a preferred form of this invention the tracking frame is pivotally coupled to the supportive vertical frame structure, and will thus pivot rearwardly out of the discharge orifices in response to predetermined forces. In alternative embodiments of this invention the tracking frame is adapted to temporarily shorten in length in response to predetermined pressure, to thereby withdraw from discharge orifices at preselected times.

The tracking section preferably comprises latching means for selectively grasping the partition between adjacent orifices, to effect graduated downward movement. The latching means preferably includes a pivotally coupled finger for temporarily grasping the silo orifice partition, thereby enabling the tracking section to sustain an intermediate lower position within an orifice before finally becoming disengaged from the header and dropping to a lower position. Thus, when the tracking section removes itself from an upper silage discharge orifice, it will latch itself in an intermediate position before dropping the remaining distance and contacting the lower header.

Roller wheel means preferably associated with the tracking section facilitates sequential, graduated control. The roller means contacts the outer surface of the header or partition between adjacent discharge orifices to smoothly guide the tracking section. In combination with the fork, the roller wheel means thus enables the tracking means to orderly progress between adjacent silage discharge orifices. In an alternative embodiment of this invention roller wheel mounting means are pivotally coupled to the tracking frame to enable the tracking frame to effectively vary in length at an appropriate time.

The silage output chute is preferably secured relative to the torque arm assembly by a suspension bracket, which operatively secures the silage discharge chute in a position aimed towards the desired silage discharge orifice during unloading. The bracket comprises bearing means for riding the tracking means so that the supporting tracking means remains free to move generally horizontally with respect to the bracket.

Thus an important object of this invention is to provide a torque arm assembly for guiding and aiming silage discharge output chutes.

Another object of this invention is to provide a torque arm assembly of the character described which can be quickly and easily adapted for use with a plurality of conventional silage unloaders.

Another object of this invention is to provide a silage unloader with a torque arm assembly of the character described to facilitate the orderly, sequential movement of the output chute apparatus between adjacent vertically disposed silage discharge orifices in response to the lowering of silage during a rotary silo unloading process.

A still further object of this invention is to provide a torque arm assembly of the character described which will quickly and easily drop to a lower location within the silo, while minimizing unnecessary shock forces which may be generated when the torque arm contacts the header. It is an important feature of this invention that the torque arm assembly first assumes an intermediate position within an orifice before dropping into contact with the lower header.

Still another object of this invention is to provide an improved means for controlling silo unloader chutes during automatic unloading of conventional silos.

Yet another important object of this invention is to provide a torque arm assembly for silo unloaders for facilitating proper vertical movement of the unloader within the silo, and for properly, automatically positioning the remote output end of the silage output chute.

Yet another object of this invention is to provide torque arm apparatus of the character described which will automatically, downwardly track within the conventional vertically spaced apart silage discharge orifices as the silage level decreases.

These and other objects and advantages of this invention, along with features of novelty appurtenant thereto, will appear or become apparent in the course of the following detailed description.

BRIEF DESCRIPTION OF THE DRAWINGS

In the following drawings, which form a part of the specification and are to be construed in conjunction therewith, and in which like reference numerals have been employed throughout to indicate like parts in the various views:

FIG. 5 is a side elevational view showing the preferred torque arm assembly engaged within an upper silo discharge orifice;

FIG. 6 is a side elevational view similar to FIG. 5 showing the torque arm assembly partially withdrawn from an upper silo discharge orifice;

DETAILED DESCRIPTION OF THE DRAWINGS

Figure 1:
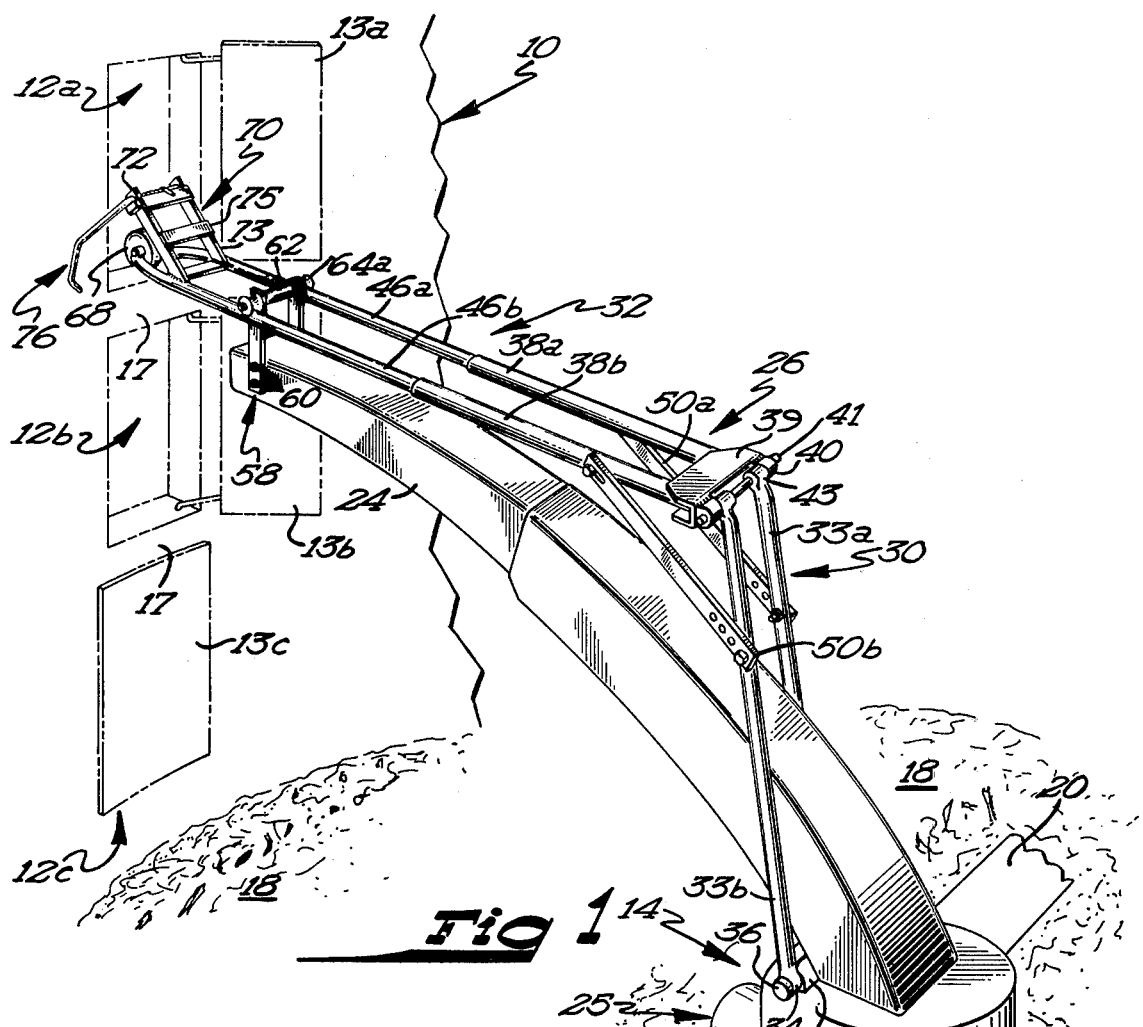
FIG. 1 is a perspective view showing a silo unloader internally disposed within a silo and depicting a preferred embodiment of a torque arm assembly constructed in accordance with the teachings of this invention.

In FIG. 1 there is seen a conventional agricultural silo 10 of generally vertically upright construction which includes a plurality of vertically, spaced apart silage discharge orifices 12a–12c through which silage may be unloaded. Doors 13a–13c may be provided to selectively block the orifices. Centrally disposed within silo 10 is a conventional silo unloader 14, comprising a collector ring portion 16 which is suspended or supported within the silo on top of stored silage 18 to be unloaded. The unloader 14 includes an auger assembly 20 which is rotatably coupled at the base of collector ring 16 and driven through motors (not shown) to revolve in a circular manner interiorly of the silo on top of silage 18. The auger assembly 20 will collect silage, which will be forced through output chute 24 by a motor or impeller 25 of conventional construction. In the position illustrated it will be apparent that the unloader discharges silage through the discharge orifice 12b.

A preferred torque arm assembly 26, constructed in accordance with the teachings of this invention, guides and supports discharge chute 24. The torque arm assembly 26 extends through upper orifice 12a to properly position the chute 24 relative to lower orifice 12b. As the level of silage 18 continually decreases during unloading of the apparatus, the unloader assembly 14 will of course recede to a lower position within the silo, so that it will be apparent that chute 24 must eventually be repositioned for outputting silage through lower output orifice 12c. The torque arm assembly 26 is adapted to sequentially engage the discharge orifices 12a–12c, while continuously aiming the discharge chute, through a rocking motion to be later described.

The torque arm assembly 26 preferably comprises first frame means 30 which is pivotally coupled to and extends generally vertically upwardly from the unloader apparatus 14, and tracking frame means 32 which is preferably pivotally coupled to vertical frame means 30. The tracking means 32 extends generally horizontally outwardly from the unloader toward the silage discharge orifices 12a–12c which it sequentially engages. The vertical frame means 30 preferably comprises a pair of spaced apart, parallel rod members 33a and 33b, the bottom portions of which include tubular portions 34 which are pivotally secured to a sleeve 35 at opposite sides thereof by axle bolts 36. Thus the first frame means is pivotally movable with respect to the lower unloader. The tracking frame 26 preferably comprises a pair of spaced apart, parallel rods 38a and 38b, which are rigid with a transverse web 39 to which spaced apart coupling mandrels 40 are rigidly secured. Axle 41 extends through and between mandrels 40. It will be apparent that the upper portions of each vertical frame section member 33a and 33b are provided with tubular sleeve portions 43 which receive axle 41 to provide pivotal coupling between the first and second frame sections. Thus, in the preferred embodiment, frame section 26 is pivotally displaceable with respect to the vertical frame section 30.

In the preferred embodiment, tracking means 26 also comprises a pair of similar elongated rods 46a and 46b which are respectively secured to and received by the elongated tubular elements 38a and 38b. In the preferred embodiment illustrated in FIGS. 1 and 7 members 46a and 46b are not displaceable with respect to rods 38a and 38b. However, as will later be discussed in conjunction with FIG. 9, tracking frame members 46a and 46b may, if desired, be telescopingly coupled to tubular elements 38a and 38b respectively to facilitate axial displacement therebetween.

Figure 2:
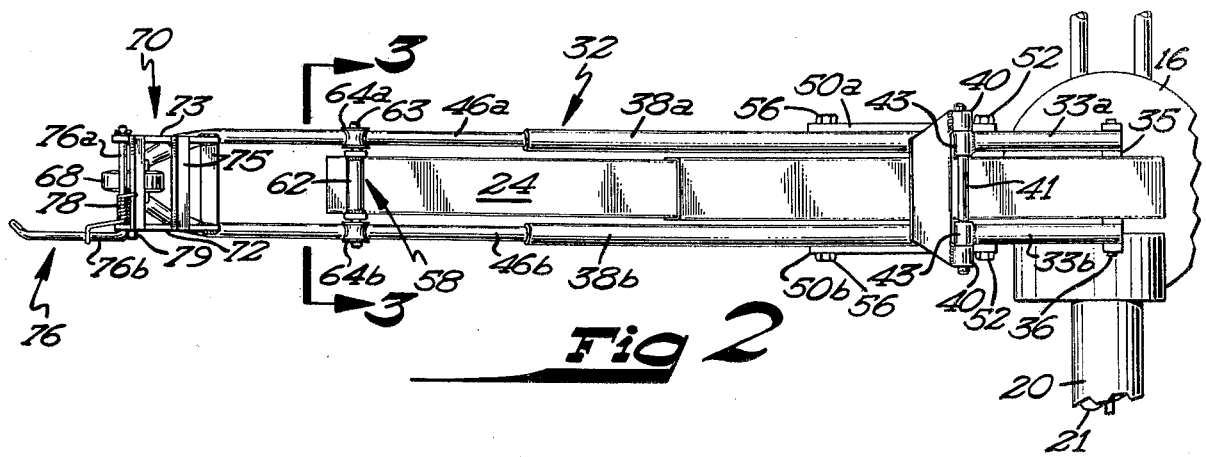
FIG. 2 is an enlarged, top plan view of the torque arm assembly shown in FIG. 1.

A pair of similar reinforcement brackets 50a and 50b extend between the tracking frame means and the first frame means. Bracket 50a extends between rods 38a and 33a (FIGS. 1 and 2), and bracket 50b extends between elements 38b and 33b. Each bracket is secured at one end via a bolt 52, which is secured through a desired one of a plurality of mounting orifices 53, which may be selected to accommodate unloaders of different sizes. The opposite end of each reinforcement bracket includes an elongated aperture slot 56 through which another mounting bolt 57 extends, being received within a threaded orifice (not shown) within the appropriate rod portion 38a or 38b. The upper tracking section 32 is thus pivotal within limits determined by the length of slot 56.

A bearing bracket 58 is preferably employed to suspend the chute 24 from the tracking frame section 32.

Figure 3:
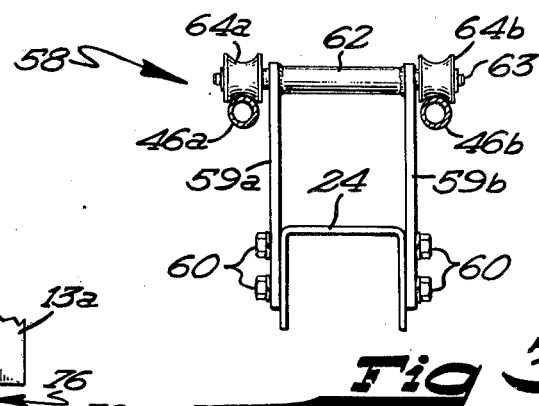
FIG. 3 is a side sectional view taken generally along line 3—3 in FIG. 2.

As best viewed in FIG. 3, the bearing bracket 58 comprises a pair of spaced apart side braces 59a and 59b which are rigidly secured to opposite sides of chute 24 by a plurality of mounting bolts 60, and which are secured by welding or the like at opposite sides of a sleeve member 62. An axle member 63 is coaxially, rotatably received through sleeve 62, and the axle ends receive a pair of spaced apart roller wheels 64a and 64b. It will be appreciated that the roller wheels contact and are supported by the tracking frame means (more particularly frame rods 46a and 46b), enabling horizontal movement of the torque arm assembly independently of the chute 24. It will also be appreciated that, because of the space between sleeve 62 and chute 24 (FIG. 3), the torque arm is free to drop or pivot vertically or horizontally a predetermined distance without affecting the position of output chute 24. In this manner the chute 24 will be suspended from the torque arm assembly, and if desired the base of the chute may be rigidly affixed to the unloader without any form of pivotal coupling. As the unloader moves down in the silo due to decreasing silage level, the torque arm assembly will properly maintain the chute in a correct operative position relative to the silage orifice through which it is discharging silage.

Figure 4:
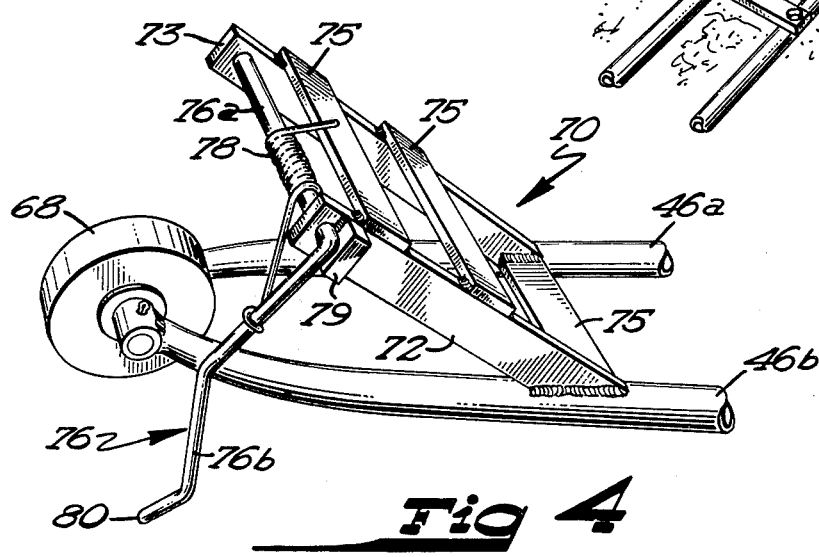
FIG. 4 is an enlarged view of the latching means and a preferred form of a roller wheel assembly.

Tracking of frame section 32 is substantially accomplished with the latching means best illustrated in FIG. 4. A rigid, inclined finger support 70 is attached to rods 46a and 46b and comprises a pair of spaced apart braces 72 and 73, between which a plurality of transverse reinforcements 75 are rigidly secured. A finger 76 includes a transverse axle portion 76a rotatably mounted between support braces 72 and 73 and an integral, downwardly extending (as viewed in FIG. 4) portion 76b adapted to selectively contact silo orifice partitions 17. A spring 78 normally biases finger 76 downwardly into contact with a stop member 79, to normally maintain the finger in the orifice engaging position illustrated in FIGS. 4 and 5. The extreme tip 80 of finger 76 is preferably bent slightly to insure positive (although temporary) engagement with silo orifice partitions during operation.

A roller wheel means 68 is preferably included to smoothly contact orifice partitions. Wheel 68 is rotatably suspended between the extreme, converging ends of tracking frame rod portions 46a and 46b, and will prevent the tracking means from scraping the orifice partitions 17 during downward movement.

Figure 7:
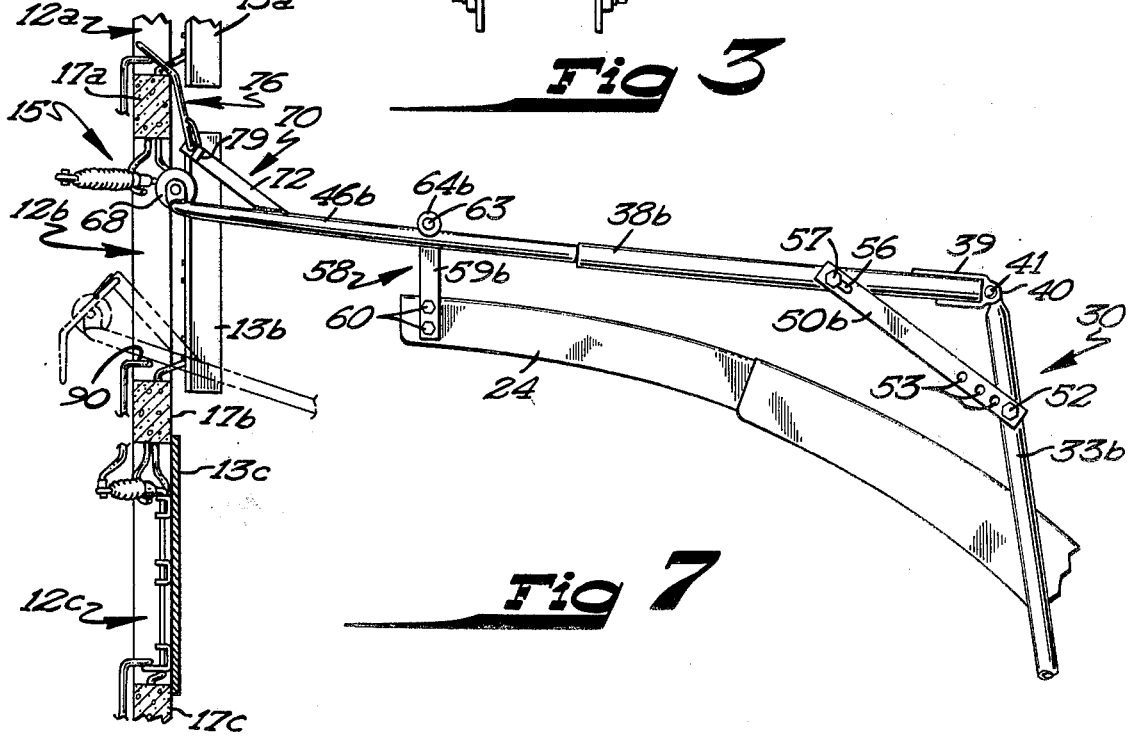
FIG. 7 is a side elevational view similar to FIGS. 5 and 6 but showing the torque arm assembly in an intermediate position just prior to dropping into a lower silage discharge orifice.

Operation of the apparatus is illustrated sequentially in FIGS. 5 through 7, which depict the rocking motion of the apparatus. In FIG. 3 the tracking section 32 penetrates upper orifice 12a and rests upon partition 17a immediately below. It will be apparent that at this time silage 18a being discharged from chute 24 will be directed through the lower discharge orifice 12b. Doors 13a and 13b will of course be open at this time. As silage is continuously unloaded, the level of silage within the silo will decrease, causing the apparatus to gradually recede to a lower position. A somewhat lower portion is illustrated in FIG. 6, wherein the tracking assembly 32 has partially withdrawn from orifice 12a just far enough so that roller wheel 68 contacts an outer surface of partition 17a and the latch finger 76 grasps the partition, contacting it with bent portion 80 thereof. It will be apparent that in the position illustrated in FIG. 6, the torque arm assembly has pivoted rearwardly with respect to the unloader apparatus, and simultaneously the tracking frame has pivoted downwardly (with respect to vertical frame portion 30) to a position established by the limiting action of elongated brace orifice 56.

When the torque arm assembly is in the intermediate withdrawal position illustrated in FIG. 6, much of the weight of the upper assembly will be concentrated on roller wheel 68 so that the torque arm will slowly descend to a lower position without the sudden jerking characteristic of prior art torque arms. As the unloader continues to drop within the silo the intermediate position illustrated in FIG. 7 will be reached, wherein the roller wheel 68 has dropped from contact with partition 17a and is substantially located within orifice 12b. In this intermediate position finger 76 will be contacting the upper, inner edge of partition 17a to temporarily slow the torque arm while indexing to a lower position thereby reducing the impact of the falling tracking frame 32 on the vertical door header 17b. As the silage level decreases the tracking frame 32 will be pulled out of the door opening 12a until a position shown in FIG. 6 is achieved. At this point the torque arm will be in an angular relation between the unloader and the vertical door header 17a creating a wedging action which would prevent an index movement until the silage level had receded a depth equal to that of the vertical header 17a. At this point the tracking section will pivot outwardly with respect to vertical frame portion 30 and the frame portion 30 will pivot away from the vertical door header 17a relieving the wedging and allowing the tracking frame portion 32 to be pulled downwardly against predetermined tension from finger 76 and spring 78. When finger 76 is disengaged, the torque arm will drop to a position illustrated in dotted lines. At this moment in time the tracking section will pivot outwardly with respect to the vertical frame portion 30 and the frame portion 30 will pivot towards the orifice until maximum pivotal displacement is established in slot 56, whereupon the cycle will repeat until the unloading process is completed. It will be appreciated that when the torque arm assembly drops to the dotted line position illustrated in FIG. 7, the shock forces generated will not be directly transmitted to the chute because tracking portion 32 is free to drop relative to guide wheels 64a and 64b.

As explained in detail in my above-cited co-pending application, the silo may include a plurality of silage discharge doors 13a–13c suspended in the various discharge orifices by linkage 15. Each door may be operated by contacting a trigger means 90 which is preferably disposed just above each partition 17a–17b. It will be apparent that, as illustrated in FIGS. 5 and 7, the torque arm assembly will contact trigger 90 in order to open the next lower discharge door. As illustrated in dotted lines in FIG. 7, rod 46b will hit trigger 90 to open lower door 13c automatically. Thus, through the employment of the torque arm assembly described herein, automatic silo doors of the type described and claimed in my above-mentioned, co-pending application may be successfully operated.

Figure 8:
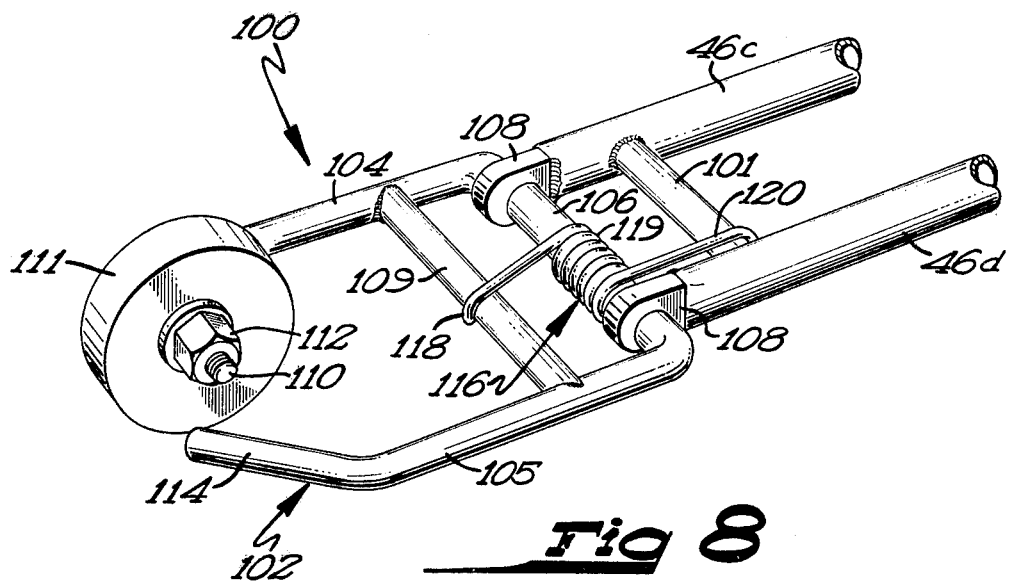
FIG. 8 is a perspective view of an alternative embodiment of a roller wheel assembly which is pivotally coupled to the tracking frame, with latching means omitted for clarity.

An alternative roller wheel embodiment is depicted in FIG. 8. The roller wheel assembly 100 shown therein is adapted to be attached at the forward end of the tracking frame and is generally pivotally coupled thereto. With the construction disclosed the wheel means may be deflected upwardly in response to predetermined pressure. In this fashion the tracking frame is able to sequentially withdraw from orifices by effectively shortening in length, and it is not necessary that the tracking frame be pivotally coupled to the vertical frame section as in the previously discussed embodiment.

The wheel means 100 is coupled to the spaced apart frame bar members 46c and 46d of the tracking frame section, which should be constructed generally as discussed earlier. The deflectable roller wheel means 100 comprises a generally C-shaped mounting frame 102 comprising spaced apart, horizontal bars 104 and 105 which are integral with a transverse portion 106 thereof which extends through bearing apertures provided in tips 108 of the tracking frame bars 46c and 46d respectively. A generally coiled spring 116 includes a main coiled body portion 119 which is wound about section 106 and end portions 118 and 120 which abut and may be secured to cross braces 109 and 101 respectively. The roller wheel 111 is mounted to an axle shaft 110 by a bolt 112 at an end of frame portion 104. At the opposite side of the frame 102 a curved guard portion 114 may be provided integral with section 105.

When the tracking frame engages a silage discharge orifice, the wheel section will be in the position illustrated, in a fully extended orientation. However, in response to decreasing silage level the tracking frame will gradually withdraw from an orifice, and will track and drop to the lower silage discharge orifice because contact of wheel 111 against a header partition forces the wheel frame 102 to be pivoted upwardly, overcoming predetermined tension from spring 119, thereby enabling the tracking frame means to, in effect, shorten in length. In this fashion the tracking frame will track between adjacent vertically disposed silage discharge orifices without the necessity of pivotally coupling the tracking frame to the vertically extending frame means coupled to the unloader collector ring. The alternative structure shown in FIG. 8 may be substituted for wheel 68 in the previously discussed structure. Alternatively, it may be employed in combination with the structure to be discussed in conjunction with FIG. 9.

Figure 9:
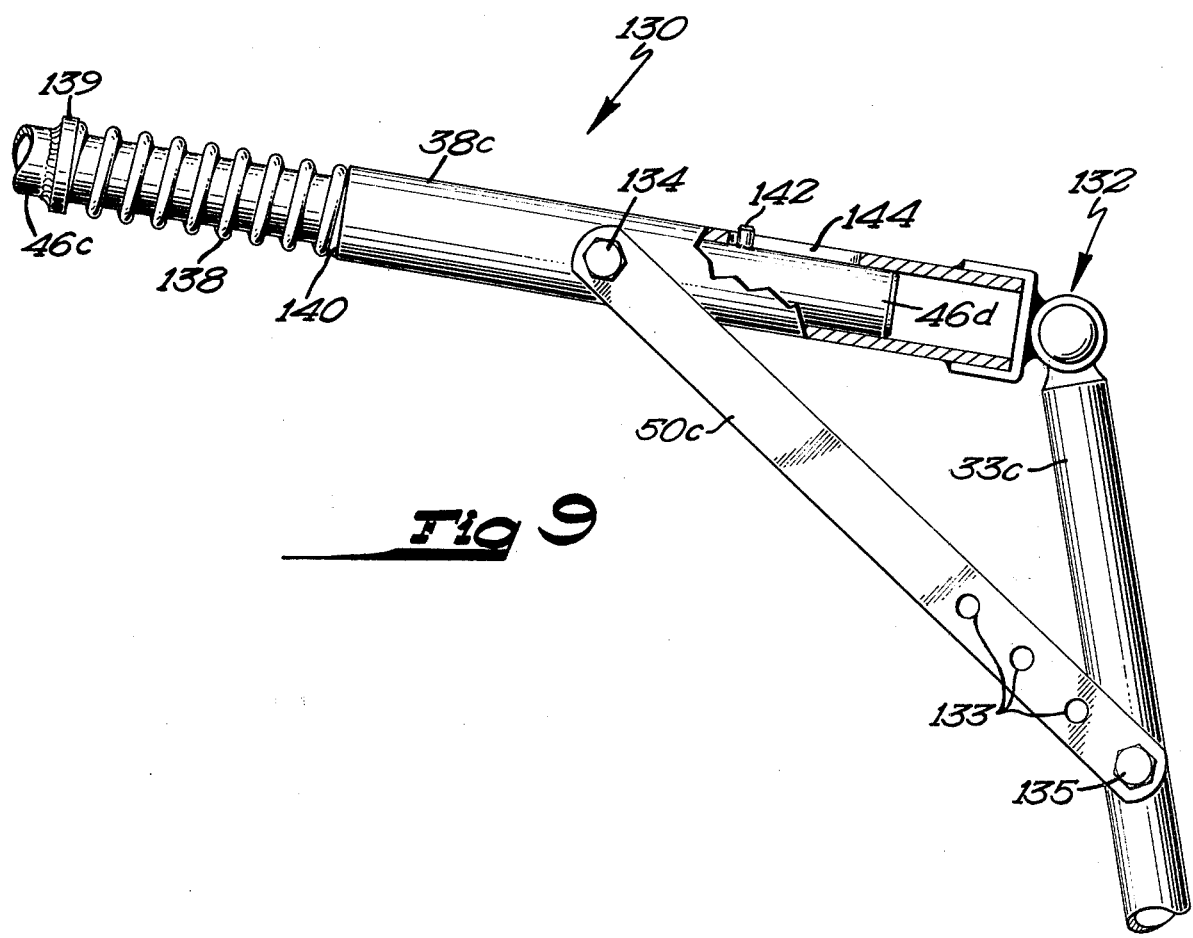
FIG. 9 is an enlarged side elevational view of an alternative embodiment of a tracking frame, with parts thereof broken away or shown in section for clarity.

In FIG. 9 the tracking frame means 130 includes modifications which also enable it to vary in length to facilitate sequential orderly withdrawal from the various silage discharge orifices. The tracking frame means 130 includes a first elongated rod section 46c which is preferably coaxially received by an elongated tubular pipe section 38c. Elements 46c and 38c thus correspond generally to elongated elements 46b and 38b. An opposite side of tracking frame 130, now shown in FIG. 9, would of course correspond generally to members 46a and 38a shown in FIGS. 1-3.

The tracking frame section 38c is rigidly coupled at 132 to a lower, supportive vertical frame bar 33c. Tracking frame 130 may be employed with a vertical frame means substantially identical to previously discussed vertical frame means 30. The reinforcement brace 50c extends between the tracking frame section 38c and the lower supportive vertical frame section 33c and is rigidly attached thereto by bolts 134 and 135 respectively. Although various holes 133 may be selected for differing applications, it will be observed that no slotted aperture need be included in this embodiment, because pivotal movement between the tracking frame and the lower vertical support frame is not necessary for the apparatus to properly function.

The tracking frame means 130 comprises a preferably coiled spring 138 which is coaxially wound about pipe segment 46c. The spring is disposed between a stop member 139 welded to pipe 46c and the outer lip or edge 140 of tracking frame pipe 38c. Spring 138 thus normally biases pipe 46c outwardly with respect to pipe 38c. It will be apparent that when the spring is relaxed, the tracking frame means will be in a fully extended position, completely engaging one of the discharge orifices. However, in response to the lowering of silage level, the apparatus will of course recede to a lower position, gradually pulling the tracking frame out of the orifice. As pressure is applied to the front end of the tracking frame 130, the pipe member 46c will be deflected rearwardly against predetermined spring pressure, being received within pipe 38c. At this time the forward end of the tracking frame will ride against the header partition, and it is thus desirable to include a traveler wheel such as wheel 68 (FIGS. 1-3) or wheel apparatus 100 (FIG. 8). However, the inclusion of the roller wheel is not mandatory.

The inner end 46d of the tracking frame pipe 46c received coaxially within pipe 38c. In certain cases it may be desired to prevent torsional displacement of pipe 46c, so that a pin 142 is optionally provided to ride within a groove 144 defined in tubular pipe 38c.

After silage level decreases the tracking frame will be temporarily latched in an intermediate position within the orifice to be engaged with latching means (not shown in FIG. 9) previously discussed, and will be nearly fully extended by the action of spring 138. For example, it is contemplated to employ latching means 70 (FIG. 4) in conjunction with apparatus 130 (FIG. 9). Thus, with the embodiment shown in FIG. 9 the tracking frame means is enabled to vary in length in response to predetermined pressure in order to facilitate sequential withdrawal and engagement of vertically spaced apart silage discharge orifices.

From the foregoing, it will be seen that this invention is one well adapted to obtain all the ends and objects herein set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A torque arm assembly for aiming a silo unloader output chute, said torque arm assembly comprising:
   first frame means adapted to be pivotally coupled to said unloader and oriented generally vertically with respect thereto;
   tracking frame means for automatically, sequentially engaging silage discharge orifices in response to lowered silage level during silo unloading, said tracking frame means pivotally coupled to said first frame means, and said tracking frame means comprising latching means for temporarily delaying said tracking means in an intermediate position within a lower discharge orifice to be engaged, and a roller wheel for contacting silage discharge orifice partitions during movement of said tracking means between an upper orifice and said intermediate position in a lower orifice;
   wheel mounting bracket means yieldably, pivotally coupled to said tracking frame means to pivot said roller wheel with respect to said tracking frame in response to predetermined pressure; and suspension means extending between said chute and said torque arm assembly for securing said silage discharge output chute in proper position relative to the silage discharge orifices.

2. The combination as defined in claim 1 wherein said suspension means comprises bracket means for coupling said output chute to said tracking means, said bracket means comprising wheel means rotatably engaging said tracking means to permit displacement of said tracking means relative to said chute.

3. The combination as defined in claim 1 wherein said latching means comprises finger means pivotally coupled to said tracking frame means for temporarily grasping a partition between adjacent upper and lower silage discharge orifices to temporarily secure said torque arm assembly in said intermediate position.

4. A torque arm assembly for aiming a silo unloader output chute, said torque arm assembly comprising:
   first frame means adapted to be pivotally coupled to said unloader and oriented generally vertically with respect thereto;
   tracking frame means for automatically, sequentially engaging silage discharge orifices in response to lowered silage level during silo unloading, said tracking frame means pivotally coupled to said first frame means, and said tracking frame means comprising latching means for temporarily delaying said tracking means in an intermediate position within a lower discharge orifice to be engaged;
   suspension means extending between said chute and said torque arm assembly for securing said silage discharge output chute in proper position relative to the silage discharge orifices; and
   bracing means extending between said first frame means and said tracking frame means, said bracing means being adapted to be rigidly secured to one of said first frame means and said tracking frame means and including elongated, slotted aperture means for attachment to the other of said first frame means and said tracking frame means, thereby permitting limited, relative pivotal displacement between said first frame means and said tracking frame means.

5. The combination as defined in claim 4 wherein said suspension means comprises bracket means for coupling said output chute to said tracking means, said bracket means comprising wheel means rotatably engaging said tracking means to permit displacement of said tracking means relative to said chute.

6. Torque arm apparatus for aiming a silo unloader output chute, said apparatus comprising:
   first frame means adapted to be coupled to said unloader and oriented generally vertically with respect thereto;
   tracking frame means for automatically, sequentially engaging silage discharge orifices in response to lowered silage level during silo unloading, said tracking frame means coupled to said first frame means and adapted to vary in length in response to predetermined pressure to facilitate withdrawal from said orifices, said tracking frame means comprising a first elongated section and a second elongated section, with one of said first and second tracking frame sections being telescopingly, coaxially received by the other of said first and second tracking frame sections, thereby permitting said tracking frame means to vary in length;
   spring means on said tracking frame means positioned to normally bias one of said first and second frame sections in an axially, outwardly extended position relative to the other of said first and second tracking frame sections;
   latching means on said tracking frame means for temporarily delaying said tracking frame means in an intermediate position within a lower discharge orifice to be engaged; and
   suspension means extending between said chute and said torque arm assembly for securing said silage output chute in proper position relative to the silage discharge orifices.

7. The combination as defined in claim 6 including roller wheel means for contacting silage discharge orifice partitions during movement of said tracking means between an upper orifice and said intermediate position in a lower orifice.

8. The combination as defined in claim 6 wherein said latching means comprises finger means pivotally coupled to said tracking means for temporarily grasping a partition between adjacent upper and lower silage discharge orifices to temporarily secure said torque arm assembly in said intermediate position.

9. The combination as defined in claim 8 wherein said suspension means comprises bracket means for coupling said output chute to said tracking frame means, said bracket means comprising wheel means rotatably engaging one of said first and second tracking frame sections to facilitate axial displacement between said first and second tracking frame sections.

10. In a rotary silo unloader comprising a base portion adapted to contact silage interiorly of a silo, a silage discharge chute for outputting silage through the silage discharge orifices provided in the silo and rotary conveyor means for gathering silage to be outputted, the improvement comprising a torque arm assembly for supporting said output chute, said assembly comprising:
    first frame means pivotally coupled to said unloader and oriented generally vertically with respect thereto;
    tracking frame means pivotally coupled to said first frame means and adapted to extend generally horizontally outwardly from said unloader, said tracking means adapted to selectively, sequentially engage silage discharge orifices for guiding and aiming said chute toward the silage discharge orifices during the unloading of a silo in response to lowered silage level, said tracking means comprising:
       latching finger means pivotally coupled to support means on said tracking frame means for pivotal movement about a substantially horizontal axis with respect to said tracking frame means, for temporarily contacting a partition between adjacent upper and lower silage discharge orifices to temporarily secure said torque arm assembly in an intermediate, lowered position when partially withdrawn from a discharge orifice; and
       roller wheel means mounted on said tracking frame means for contacting a silage discharge orifice partition during movement of said tracking frame means between adjacent silage discharge orifices; and
    suspension means extending between said chute and said assembly for securing said silage discharge chute in proper position relative to the silage discharge orifices.

11. The improvement as defined in claim 10 wherein said torque arm assembly comprises bracing means extending between said first frame section and said tracking frame means, said bracing means adapted to be rigidly secured to one of said first frame section and said tracking frame means and including elongated, slotted aperture means for attachment to the other of said first frame section and said tracking frame means thereby permitting limited, relative pivotal displacement between said first frame section and said tracking frame means to facilitate rearward displacement of the apparatus when moving from one door orifice to another.

12. The improvement as defined in claim 11 wherein said suspension means comprises bracket means for coupling said output chute to said tracking frame means, said bracket means comprising wheel means rotatably engaging said tracking frame means to permit displacement of said tracking frame means relative to said chute.

13. The improvement as defined in claim 10 including bracket means for mounting said roller wheel means, said bracket means pivotally coupled to said tracking frame means and responsive to predetermined pressure to deflect relative thereto, thereby shortening the length of said tracking frame means to enable it to withdraw from said orifices.

14. The improvement as defined in claim 10 wherein said tracking frame means comprises a first elongated section and a second elongated section, said second elongated section coupled to said first elongated section and axially displaceable with respect thereto, thereby permitting said tracking frame means to vary in length.

15. The improvement as defined in claim 14 wherein said suspension means comprises bracket means for coupling said output chute to said tracking frame means, said bracket means comprising wheel means rotatably engaging one of said first and second tracking frame sections to facilitate axial displacement between said first and second tracking frame sections.

16. The improvement as defined in claim 14 wherein one of said first and second tracking frame sections is telescopingly, coaxially received by the other of said first and second tracking frame sections, and said tracking frame means comprises spring means for normally biasing one of said first and second frame sections in an axially outwardly extended position relative to the other of said first and second tracking frame sections.

17. The improvement as defined in claim 10 wherein said tracking frame means further comprises spring means normally biasing said latching finger means downwardly towards said partitions between adjacent silage discharge orifices.

* * * * *